US008444463B2

United States Patent
Terada et al.

(10) Patent No.: US 8,444,463 B2
(45) Date of Patent: May 21, 2013

(54) GAME DEVICE, METHOD FOR CONTROLLING GAME DEVICE, PROGRAM, AND INFORMATION STORAGE MEDIUM

(75) Inventors: Toshiyuki Terada, Minato-ku (JP);
Naoya Hatsumi, Minato-ku (JP);
Hitoshi Otomo, Minato-ku (JP);
Kenichi Akiyama, Minato-ku (JP);
Motoki Kanematsu, Minato-ku (JP);
Takeshi Okubo, Minato-ku (JP);
Takashi Onishi, Minato-ku (JP);
Yoshinori Shiigi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 14 days.

(21) Appl. No.: 13/057,388

(22) PCT Filed: Jun. 3, 2009

(86) PCT No.: PCT/JP2009/060175
§ 371 (c)(1),
(2), (4) Date: Feb. 3, 2011

(87) PCT Pub. No.: WO2010/016324
PCT Pub. Date: Feb. 11, 2010

(65) Prior Publication Data
US 2011/0136557 A1    Jun. 9, 2011

(30) Foreign Application Priority Data
Aug. 5, 2008 (JP) .................. 2008-202325

(51) Int. Cl.
*A63F 13/00* (2006.01)
(52) U.S. Cl.
USPC ............. 463/4; 463/32; 463/35; 463/43
(58) Field of Classification Search
USPC ........................... 463/4, 32, 35, 43
See application file for complete search history.

(56) References Cited

U.S. PATENT DOCUMENTS 8,287,369 B2    10/2012   Mori
2004/0229691 A1*  11/2004   Kawai et al. ............ 463/31
(Continued)

FOREIGN PATENT DOCUMENTS

JP    2004-329531 A    11/2004
JP    2007-167141 A     7/2007
(Continued)

OTHER PUBLICATIONS

Tawainese Office Action, Application No. 98120029, dated Jun. 20, 2012.

*Primary Examiner* — Pierre Eddy Elisca
*Assistant Examiner* — Shahid Kamal
(74) *Attorney, Agent, or Firm* — Sughrue Mion, PLLC

(57) ABSTRACT

A game device is provided. The game device includes a pass target selector, an operated target switcher, a first player controller, and a second player controller. The pass target selector selects a player character to be a pass target in a case where a first player character is in possession of a moving object. The switcher switches the user operated target from the first player character to a second player character. The first player controller moves the first player character and the moving object after switching, based on a position of an opponent player character, determines whether positions of the first player character or the moving object and the second character satisfy a condition, and causes, if the condition is satisfied, the first player character to make a pass to the second player character. The second player controller moves the second player character after switching.

15 Claims, 7 Drawing Sheets

U.S. PATENT DOCUMENTS

| | | |
|---|---|---|
| 2005/0176502 A1* | 8/2005 | Nishimura et al. ............ 463/31 |
| 2008/0026838 A1* | 1/2008 | Dunstan et al. ................ 463/30 |
| 2009/0048009 A1* | 2/2009 | Brekelmans et al. ............ 463/4 |
| 2009/0170600 A1 | 7/2009 | Komatsumoto |
| 2009/0189982 A1* | 7/2009 | Tawiah ........................ 348/157 |
| 2010/0160011 A1* | 6/2010 | Izumi et al. ...................... 463/1 |
| 2010/0178968 A1 | 7/2010 | Mori |
| 2010/0248804 A1 | 9/2010 | Matsumaru |
| 2010/0317439 A1* | 12/2010 | Izumi ............................ 463/36 |
| 2011/0124386 A1* | 5/2011 | Kondo et al. ..................... 463/4 |
| 2011/0300935 A1* | 12/2011 | Yoshikawa et al. ............ 463/31 |

FOREIGN PATENT DOCUMENTS

| | | |
|---|---|---|
| JP | 2007-260157 A | 10/2007 |
| JP | 2008-054760 A | 3/2008 |
| TW | 200727952 A | 8/2007 |
| TW | 200812675 A | 3/2008 |

* cited by examiner

| OPERATED PLAYER ID | B |
| --- | --- |
| BALL KEEPING PLAYER ID | A |
| PASS TARGET PLAYER ID | B |

US 8,444,463 B2

GAME DEVICE, METHOD FOR CONTROLLING GAME DEVICE, PROGRAM, AND INFORMATION STORAGE MEDIUM

CROSS REFERENCE TO RELATED APPLICATIONS

This application is a National Stage of International Application No. PCT/JP2009/060175 filed on Jun. 3, 2009, which claims priority from Japanese Patent Application No. 2008-202325, filed on Aug. 5, 2008, the contents of all of which are incorporated herein by reference in their entirety.

TECHNICAL FIELD

The present invention relates to a game device, a method for controlling a game device, a program, and an information storage medium.

BACKGROUND ART

There is known a sport game played between a user operated team and an opponent team, using a moving object. For example, there is known a soccer game, a basket ball game, or an ice hockey game.
[Patent Document 1] JP 2007-167141 A

DISCLOSURE OF THE INVENTION

Problems to be Solved by the Invention

In the above described game, a user aims to make a score event while repeating a pass between player characters. For this purpose, in the above described game, improvement in operability of an operation related to a pass between player characters is required.

The present invention has been conceived in view of the above, and aims to provide a game device, a method for controlling a game device, a program, and an information storage medium capable of improving operability of an operation related to a pass between player characters in a sport game played between a user operated team and an opponent team using a moving object.

Means for Solving the Problems

In order to solve the above described object, a game device according to the present invention is a game device for executing a sport game played between a user operated team and an opponent team using a moving object, comprising: pass target selecting means for selecting a player character to be a pass target from among player characters belonging to the operated team, based on a user operation, in a case where a first player character which is a user operated target among player characters belonging to the operated team is in possession of the moving object; operated target switching means for switching, if a second player character is selected as the pass target by the pass target selecting means, the user operated target from the first player character to the second player character; first player control means for controlling an action of the first player character after the user operated target is switched from the first player character to the second player character by the operated target switching means; and second player control means for moving the second player character based on a user operation, after the user operated target is switched from the first player character to the second player character by the operated target switching means, wherein the first player control means includes movement control means for moving the first player character and the moving object, based on a position of a player character belonging to the opponent team, means for determining whether or not a position/positions of the first player character or/and the moving object and a position of the second character satisfy a condition concerning a position/positions of the first player character or/and the moving object and a position of the second player character, and means for causing, if it is determined that the condition is satisfied, the first player character to make a pass to the second player character.

A method for controlling a game device according to the present invention is a method for controlling a game device for executing a sport game played between a user operated team and an opponent team using a moving object, comprising: a pass target selecting step of selecting a player character to be a pass target from among player characters belonging to the operated team, based on a user operation, in a case where a first player character which is a user operated target among player characters belonging to the operated team is in possession of the moving object; an operated target switching step of switching, if a second player character is selected as the pass target at the pass target selecting step, the user operated target from the first player character to the second player character; a first player control step of controlling an action of the first player character after the user operated target is switched from the first player character to the second player character at the operated target switching step; and a second player control step of moving the second player character based on a user operation, after the user operated target is switched from the first player character to the second player character at the operated target switching step, wherein the first player control step includes a movement control step of moving the first player character and the moving object, based on a position of a player character belonging to the opponent team, a step of determining whether or not a position/positions of the first player character or/and the moving object and a position of the second character satisfy a condition concerning a position/positions of the first player character or/and the moving object and the position of the second player character, and a step of causing, if it is determined that the condition is satisfied, the first player character to make a pass to the second player character.

A program according to the present invention is a program for causing a computer to function as a game device for executing a sport game played between a user operated team and an opponent team using a moving object, the program for causing the computer to function as: pass target selecting means for selecting a player character to be a pass target from among player characters belonging to the operated team, based on a user operation, in a case where a first player character which is a user operated target among player characters belonging to the operated team is in possession of the moving object; operated target switching means for switching, if a second player character is selected as the pass target by the pass target selecting means, the user operated target from the first player character to the second player character; first player control means for controlling an action of the first player character after the user operated target is switched from the first player character to the second player character by the operated target switching means; and second player control means for moving the second player character based on a user operation, after the user operated target is switched from the first player character to the second player character by the operated target switching means, wherein the first player control means includes movement control means for moving the first player character and the moving object, based on a position of a player character belonging to the opponent team, means for determining whether or not a position/positions of the first player character or/and the moving object and a position of the second character satisfy a condition concerning a position/positions of the first player character or/and the moving object and the position of the second player character, and means for causing, if it is determined that the condition is satisfied, the first player character to make a pass to the second player character.

An information storage medium according to the present invention is a computer readable information storage medium storing the above described program.

According to the present invention, it is possible to improve, in a sport game played between a user operated team and an opponent team using a moving object, operability related to a pass between player characters.

According to one aspect of the present invention, the first player control means may include means for determining whether or not a reference period of time has elapsed after a reference moment, and means for causing, if it is determined that the reference period of time has elapsed after the reference moment, the first player character to make a pass to the second player character.

According to another aspect of the present invention, the first player control means may include means for determining whether or not a reference period of time has elapsed after a reference moment, and means for restricting, if it is determined that the reference period of time has elapsed after the reference moment, execution of moving control of the first player character and the moving object by the movement control means.

According to still another aspect of the present invention, the first player control means may include means for setting the reference period of time, based on a user operation.

According to still another aspect of the present invention, the game device may further comprise means for presenting to a user either a period of time elapsed after the reference moment or a remaining period of time until the reference period of time will have elapsed after the reference moment.

According to still another aspect of the present invention, the first player control means may include means for determining a type of a pass from the first player character to the second player character, based on a user operation.

According to still another aspect of the present invention, the game device may further comprise means for restricting, if the first player character is not a player character which satisfies a predetermined first condition, switching of the user operated target by the operated target switching means or execution of control by the first player control means.

According to still another aspect of the present invention, if the first player character is in possession of the moving object, the pass target selecting means may select as a player character to be a pass target a player character which satisfies a predetermined second condition from among the player characters belonging to the operated team, based on a user operation.

According to still another aspect of the present invention, the game device may further comprise means for encouraging a user to set action control information concerning action control of the player characters belonging to the operated team, and means for controlling, after the user operated target is switched from the first player character to the second player character by the operated target switching means, actions of player characters other than the first player character and the second player character among the player characters belonging to the operated team, based on the action control information set by the user. If the first player character is in possession of the moving object, the pass target selecting means may select a player character to be a pass target from among the player characters belonging to the operated team, based on the action control information set by the user.

BEST MODE FOR CARRYING OUT THE INVENTION

In the following, one example of an embodiment of the present invention will be described in detail based on the accompanying drawings. A game device according to the embodiment of the present invention is realized using, for example, a consumer game device (an installed game device), a portable game device, a portable phone, a personal digital assistant (PDA), a personal computer, or the like. Below, a case in which a game device according to the embodiment of the present invention is realized using a consumer game device will be described.

Figure 1:
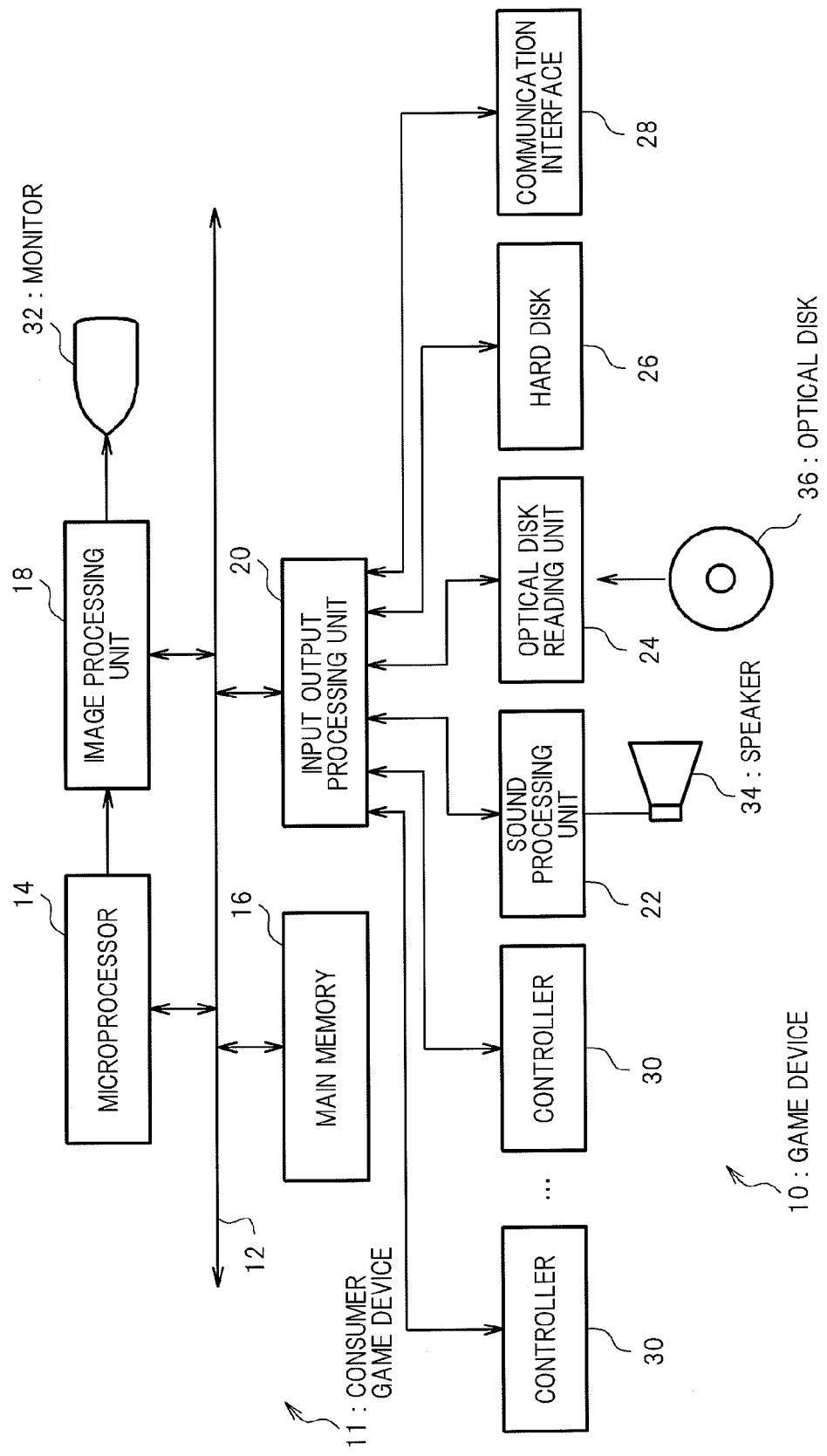
FIG. 1 is a diagram showing a hardware structure of a game device according to the embodiment.

FIG. 1 is a diagram showing an entire structure of a game device according to the embodiment of the present invention. The game device 10 shown in FIG. 1 comprises a consumer game device 11, a monitor 32, a speaker 34, and an optical disk 36 (an information storage medium). The monitor 32 and the speaker 34 are connected to the consumer game device 11. As the monitor 32, for example, a home-use television set receiver is used, while a speaker built in to the home-use television set receiver, for example, is used as the speaker 34.

The consumer game device 11 is a publicly known computer game system and comprises a bus 12, a microprocessor 14, a main memory 16, an image processing unit 18, an input output processing unit 20, a sound processing unit 22, an optical disk reading unit 24, a hard disk 26, a communication interface 28, and a controller 30.

The microprocessor 14 controls the respective units of the consumer game device 11, based on an operating system stored in a ROM (not shown) or a program read from the optical disk 36 or the hard disk 26. The main memory 16 comprises, for example, a RAM. A program and data read from the optical disk 36 or the hard disk 26 is written into the main memory 16 when necessary. The main memory 16 is used also as a working memory of the microprocessor 14. The bus 12 is used to exchange addresses and data among the respective units of the consumer game device 11.

The image processing unit 18 includes a VRAM and renders a game screen image into the VRAM, based on image data supplied from the microprocessor 14. The image processing unit 18 converts a game screen image rendered in the VRAM into a video signal and outputs to the monitor 32 at a predetermined time.

The input output processing unit 20 is an interface via which the microprocessor 14 accesses the sound processing unit 22, the optical disk reading unit 24, the hard disk 26, the communication interface 28, and the controller 30. The sound processing unit 22 has a sound buffer and outputs via the speaker 34 various sound data (for example, game music, game sound effects, a message, or the like) read from the optical disk 36 or the hard disk 26 into the sound buffer. The communication interface 28 is an interface for connecting the consumer game device 11 to a communication network in a wired or wireless manner.

The optical disk reading unit 24 reads a program and data recorded on the optical disk 36. Although the optical disk 36 is used here to provide a program and data to the consumer game device 11, any other information storage medium, such as a memory card, or the like, may be used instead. Alternatively, a program and data may be supplied via a communication network, such as the Internet or the like, from a remote place to the consumer game device 11. The hard disk 26 is a typical hard disk device (an auxiliary memory device).

The controller 30 is a general purpose operation input means on which a user inputs various game operations. The consumer game device 11 is adapted to connection to a plurality of controllers 30. The input output processing unit 20 scans the state of the controller 30 every constant cycle (e.g., every $\frac{1}{60}^{th}$ of a second) and forwards an operating signal describing a scanning result to the microprocessor 14 via the bus 12, so that the microprocessor 14 can determine a game operation performed by a player, based on the operating signal. Note that the controller 30 may be connected to the consumer game device 11 in a wired or wireless manner.

In the game device 10, for example, a soccer game which simulates a soccer match played between a first team and a second team is carried out. This soccer game is realized by executing a program read from the optical disk 36 or the hard disk 26. The following description is made on an assumption that a first team is operated by a user and a second team is operated by a computer (microprocessor 14), though the second team may be operated by another user instead.

Figure 2:
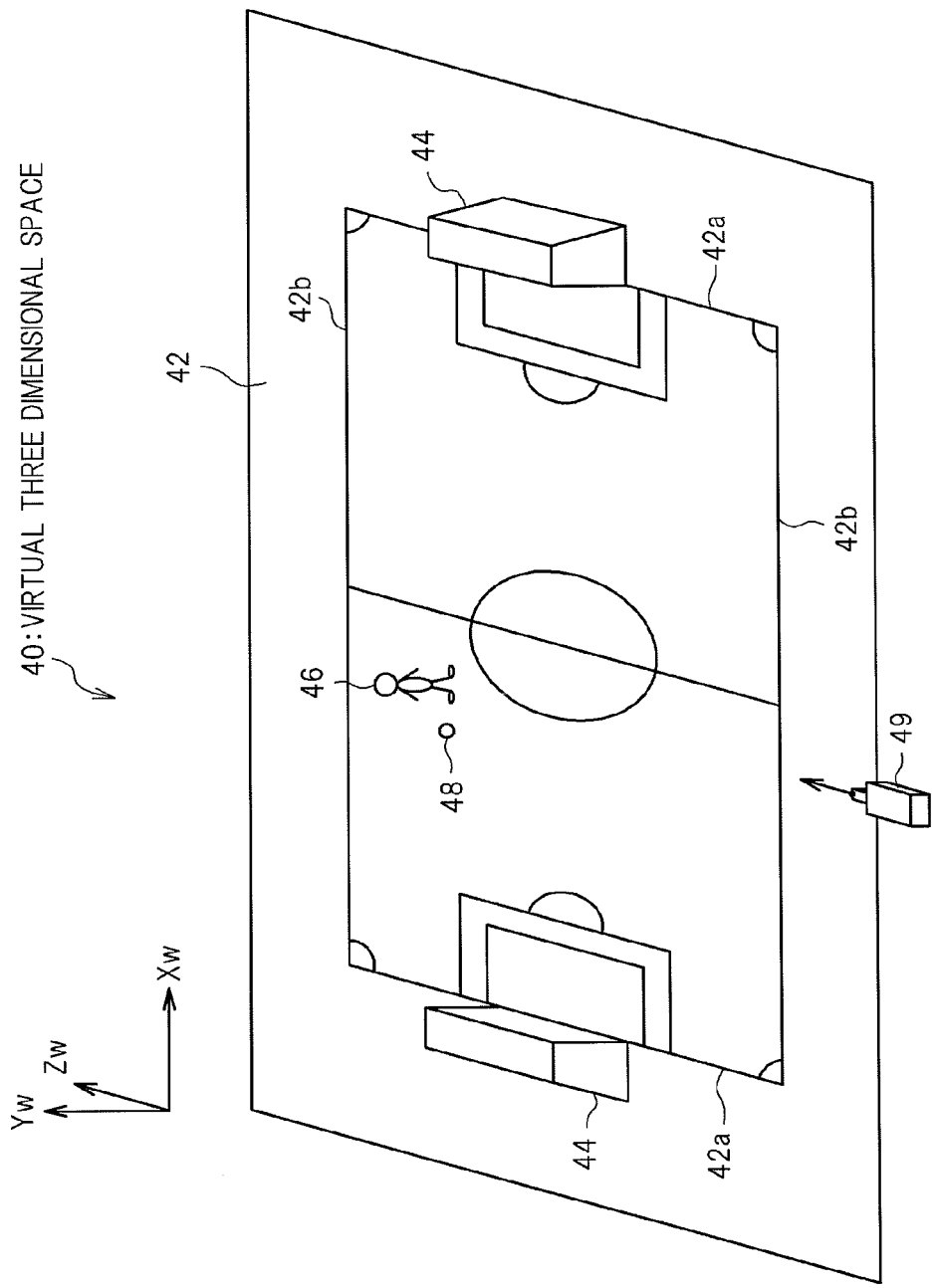
FIG. 2 is a diagram showing one example of a virtual three dimensional space.

In order to display a game screen of a soccer game, a virtual three dimensional space is created in the main memory 16. FIG. 2 shows one example of a virtual three dimensional space. As shown in FIG. 2, a field 42 being an object representing a soccer field is placed in the virtual three dimensional space 40 and, for example, goal lines 42*a* and side lines 42*b* are shown on the field 42. In addition, a goal 44 being an object representing a goal, a player character 46 being an object representing a soccer player, and a ball 48 being an object representing a soccer ball (a moving body) are also placed on the field 42.

One of the goals 44 is correlated to the first team, while the other to the second team. With the ball 48 having been moved into the goal 44 correlated to either team, a score event will occur to the other team.

Although not shown in FIG. 2, eleven player characters 46 belonging to the first team and eleven player characters 46 belonging to the second team are placed on the field 42.

If a player character 46 and the ball 48 get closer to each other, the player character 46 and the ball 48 are correlated to each other under a predetermined condition, and in such a case, the ball 48 will thereafter move according to movement of the player character 46. This is expressed as the player character 46 engaged in a dribble action. A state in which the ball 48 is correlated to a player character 46 will be hereinafter referred to as "a player character 46 in possession of the ball 48".

If a player character 46 who is in possession of the ball 48 and another player character 46 get closer to each other, the other player character 46 and the ball 48 are correlated to each other under a predetermined condition. In this manner, a player character 46 takes the ball 48 from another player character 46 who is in possession of the ball 48.

As the first team is operated by a user, as described above, any of the player characters 46 belonging to the first team is set as a target to be operated by a user (a user operated target). The user operated target is switched among the player characters 46 belonging to the first team during a match. Specifically, in a case where a user performs a predetermined operation (for example, pressing a predetermined button), the user operated target is switched to another player character 46 among those belonging to the first team.

Below, a player character 46 set as the user operated target among those belonging to the first team is referred to as an "operated player character", and player characters 46 other than the operated player character among those belonging to the first team are referred to as "teammate player characters". Player characters 46 belonging to the second team are referred to as "opponent player characters".

The operated player character acts based on an operation performed by the user. For example, the operated player character moves according to a user's movement instruction operation. Specifically, for example, in a case where the user performs a pass or shoot instruction operation, the operated player character performs a pass or shoot action.

Meanwhile, a teammate player character is operated by a computer and acts according to a predetermined algorithm. In this soccer game, a screen for encouraging the user to set a strategy (action control information) for the first team is displayed on the monitor 32 before, for example, starting a first half or a second half so that the user sets a strategy for the first team on the setting screen. As a strategy for the first team, for example, formation and a game plan are set for the first team. On the setting screen, the user selects any of, for example, a plurality of kinds of pre-prepared formations or, for example, any of a plurality of kinds of pre-prepared game plans. As a game plan, there are available, for example, "right-side attack", "left-side attack", "counter attack", and "side change". "Right-side attack" refers to a game plan involving an attack to be made mainly utilizing an area near the right side line 42*b*; "left-side attack" refers to a game plan involving an attack to be made mainly utilizing an area near the left side line 42*b*. "Counter attack" refers to a game plan in which, with an attacking player character 46 left in the front line, a ball having been taken from an opponent team is immediately passed to the attacking player character 46 to quickly shift to an attack mode. "Side change" is a game plan involving an attack to be made while moving the ball 48 through a long pass from an area near one side line 42*b* to an area near the other side line 42*b*. Based on the strategy set by the user, an action of a teammate player character is controlled so that the teammate player character acts in accordance with the strategy set by a user.

As the second team is operated by a computer, as described above, an opponent player character acts according to a predetermined algorithm. Specifically, an action of an opponent player character is controlled based on a strategy set by the computer.

A virtual camera 49 (viewpoint) is set in the virtual three dimensional space 40. The virtual camera 49 moves in the virtual three dimensional space 40, based on, for example, movement of the ball 48. Alternatively, the virtual camera 49 may move based on movement of the operated player character. A game screen image showing a picture obtained by viewing the virtual three dimensional space 40 from the virtual camera 49 is displayed on the monitor 32.

Figure 3:
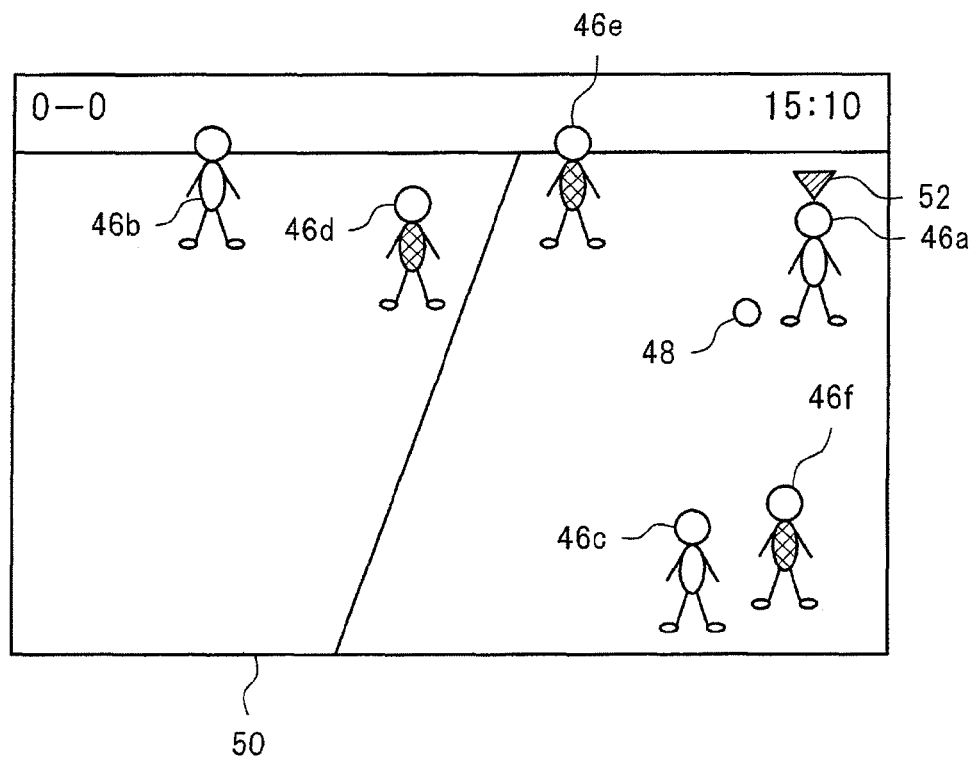
FIG. 3 is a diagram showing one example of a game screen.

FIG. 3 shows one example of a game screen. In the game screen 50 shown in FIG. 3, six player characters 46a, 46b, 46c, 46d, 46e, 46f are shown. The player character 46a is the operated player character and is in possession of the ball 48. Above the head of the player character 46a, a marker 52 is shown to indicate that the player character 46a is the operated player character. Two player characters 46b, 46c are teammate player characters, and the remaining three player characters 46d, 46e, 46f are opponent player characters.

Below, a user operation for making a pass from the operated player character (player character 46a) to another player character 46 will be described.

That is, initially, a user presses a predetermined button (hereinafter referred to as a "pass target setting button") on the controller 30 to thereby designate a player character 46 to which to direct a pass. Specifically, with a pass target setting button pressed by a user, the marker 52 moves to above the head of another teammate player character. With the pass target setting button pressed again by a user, the marker 52 moves further to above the head of still another teammate player character. In this manner, every time a user presses the pass target setting button, the marker 52 moves to above the head of another teammate player character according to a predetermined priority order. A user presses the pass target setting button once or more until the marker 52 has moved to above the head of a teammate player character which the user wishes to make a pass target.

Figure 4:
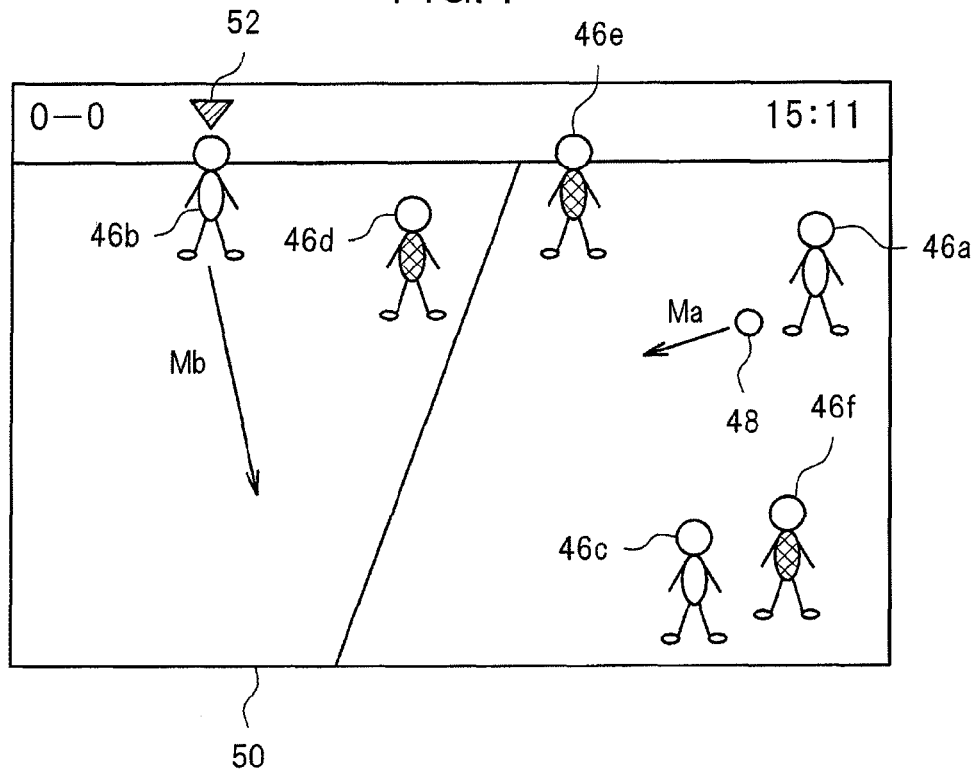
FIG. 4 is a diagram showing one example of a game screen.

FIG. 4 shows a situation in which a user moves the marker 52 to above the player character 46b to thereby select the player character 46b as a pass target. As the marker 52 identifies the user operated target, as described above, the user operated target has been switched from the player character 46a to the player character 46b in this case. In this manner, if a user selects a player character 46 to be a pass target (a pass target player character 46), the user operated target is switched to the selected player character 46. That is, an operation for selecting a pass target player character 46 corresponds to an operation for switching a user operated target to another player character 46.

In the game screen 50 shown in FIG. 4, the player character 46b, which is now the operated player character, acts according to a user operation. Meanwhile, the player character 46a, which is no longer the operated player character, acts based on a computer operation. In this case, the computer causes the player character 46a to perform a dribble action (ball keeping action) to prevent the ball 48 from being taken by an opponent player character (player characters 46d to 46f). Further, in this case, the computer causes the player character 46a to make a pass to the player character 46b if the situation allows a pass to the player character 46b, which will not be blocked by an opponent player character.

Figure 5:
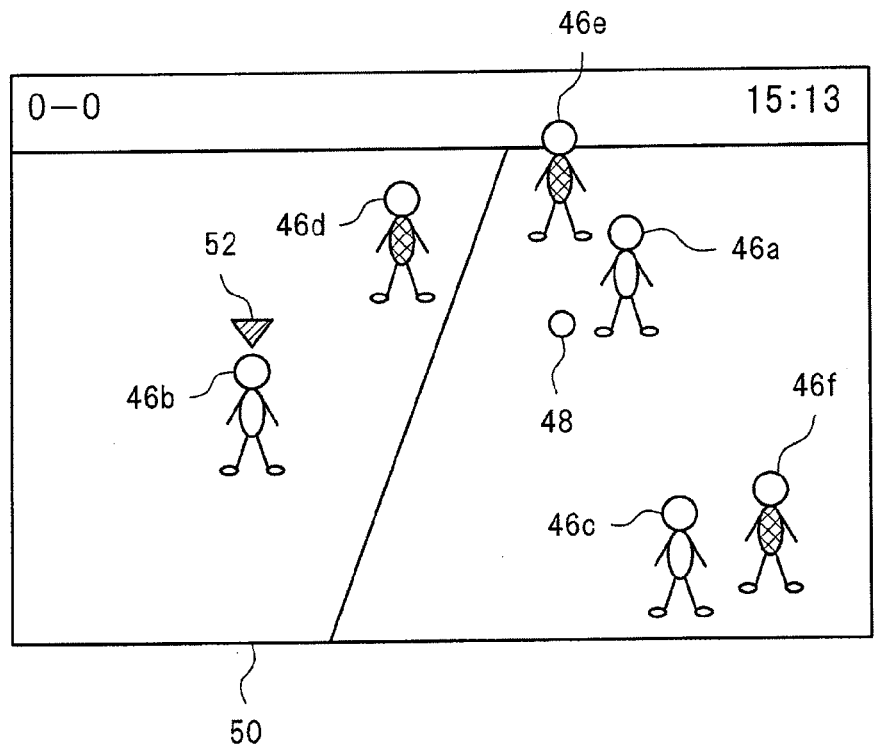
FIG. 5 is a diagram showing one example of a game screen.

In the situation shown in FIG. 4, as opponent player characters (player characters 46d, 46e) are present between the player character 46a and the player character 46b, it is determined that a pass from the player character 46a to the player character 46b will be blocked by an opponent player character, and therefore such a pass will not be made. In this case, the computer moves the player character 46a to a position where the player character 46a will be able to make a pass to the player character 46b without being blocked by an opponent player character. Specifically, for example, the computer moves the player character 46a in the Ma direction shown in FIG. 4. Meanwhile, a user moves the player character 46b to a position where the player character 46b will be able to receive a pass from the player character 46a without being blocked by an opponent player character. Specifically, for example, a user moves the player character 46b in the Mb direction shown in FIG. 4. FIG. 5 shows a game screen 50 to be shown after such movement. Note that although the player characters 46c to 46f remain in the same positions in FIG. 5, in actuality, these player characters 46c to 46f also move under the operation of the computer.

Figure 6:
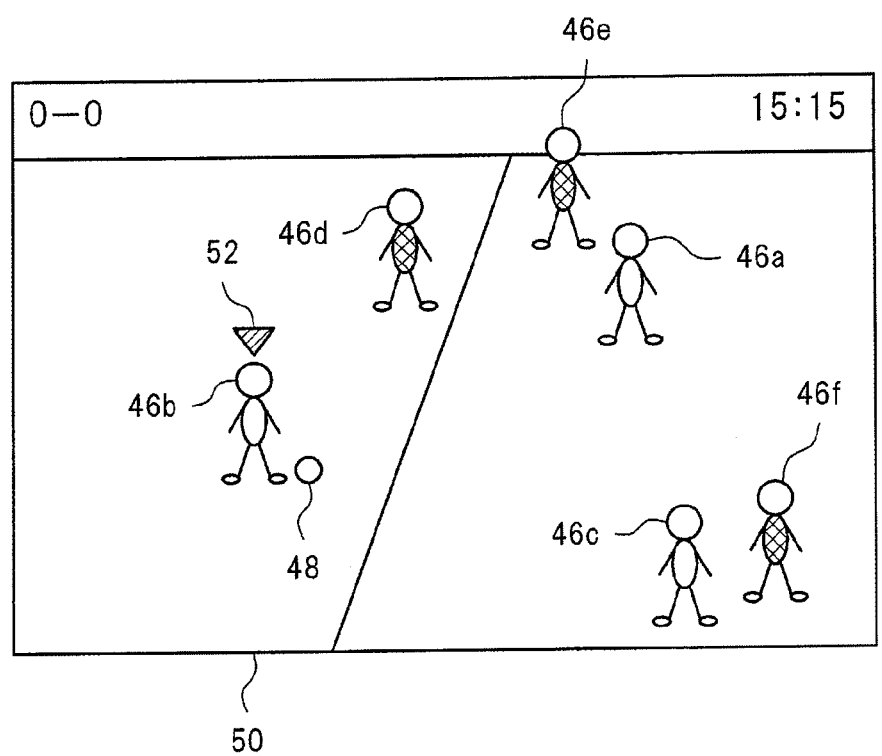
FIG. 6 is a diagram showing one example of a game screen.

In the situation shown in FIG. 5, in which no opponent player character is present between the player character 46a and the player character 46b, the computer determines that a pass from the player character 46a to the player character 46b will not be blocked by an opponent player character, and accordingly causes the player character 46a to make a pass to the player character 46b. FIG. 6 shows a game screen 50 to be shown after the pass is made.

Here, note that if a period of time elapsed after a moment when the player character 46b is selected as the pass target (i.e., a moment when the user operated target is switched to the player character 46b) reaches a reference period (e.g., three seconds), the computer causes the player character 46a to make a pass to the player character 46b even in a situation in which a pass from the player character 46a to the player character 46b is expected to be blocked by an opponent player character. Therefore, a user needs to move the player character 46b to a position where the player character 46b will be able to receive a pass from the player character 46a without being blocked by an opponent player character within a reference period (a restriction period).

As described above, in the game device 10, if a pass target player character 46 is designated while the operated player character is in possession of the ball 48, the user operated target is initially switched to the pass target player character 46, rather than the ball 48 being immediately passed to the pass target player character 46, and the player character 46 in possession of the ball 48 (i.e., the previous operated player character) thereafter makes a pass to the pass target player character 46 (i.e., the current operated player character). That is, in the game device 10, in a case where a pass between player characters 46 is made, a user is able to operate a player character 46 which will receive the pass (a pass receiving player character 46). This can resultantly improve operability of an operation related to a pass between player characters 46.

In the game device 10, when the user operated target is switched to a pass target player character 46, the player character 46 in possession of the ball 48 (i.e., the previous operated player character) automatically starts a ball keeping action to prevent the ball 48 from being taken by an opponent player character. As a result, a user can concentrate on operating a pass receiving player character 46. Regarding this point, operability of an operation related to a pass between player characters 46 can be improved in the game device 10.

In the game device 10, whether or not a situation allows a pass from a player character 46 in possession of the ball 48 to a pass target player character 46 is determined, and with determination that the situation allows such a pass, such a pass is automatically made. Here, according to an aspect in which, for example, a user decides a time to make a pass, a user needs to decide a time at which to make a pass while monitoring whether or not the situation allows such a pass. Regarding this point, in the game device 10, a user does not need to monitor whether or not a situation allows such a pass and rather can concentrate on operating a pass receiving player character 46. That is, regarding this point as well, operability of an operation related to a pass between player characters 46 can be improved in the game device 10.

Further, in the game device 10, a user needs to move a pass receiving player character 46 to a position where the pass receiving player character 46 will be able to receive a pass from a player character 46 in possession of the ball 48 without being blocked by an opponent player character. In the game device 10 in particular, a user needs to perform such a movement operation within a restriction period (e.g., three seconds). Therefore, it is possible to give a user of the game device 10 the enjoyment of being required to perform such a movement operation within a restriction period, which resultantly enhances excitement in operating a pass receiving player character 46.

Figures 7, 8:
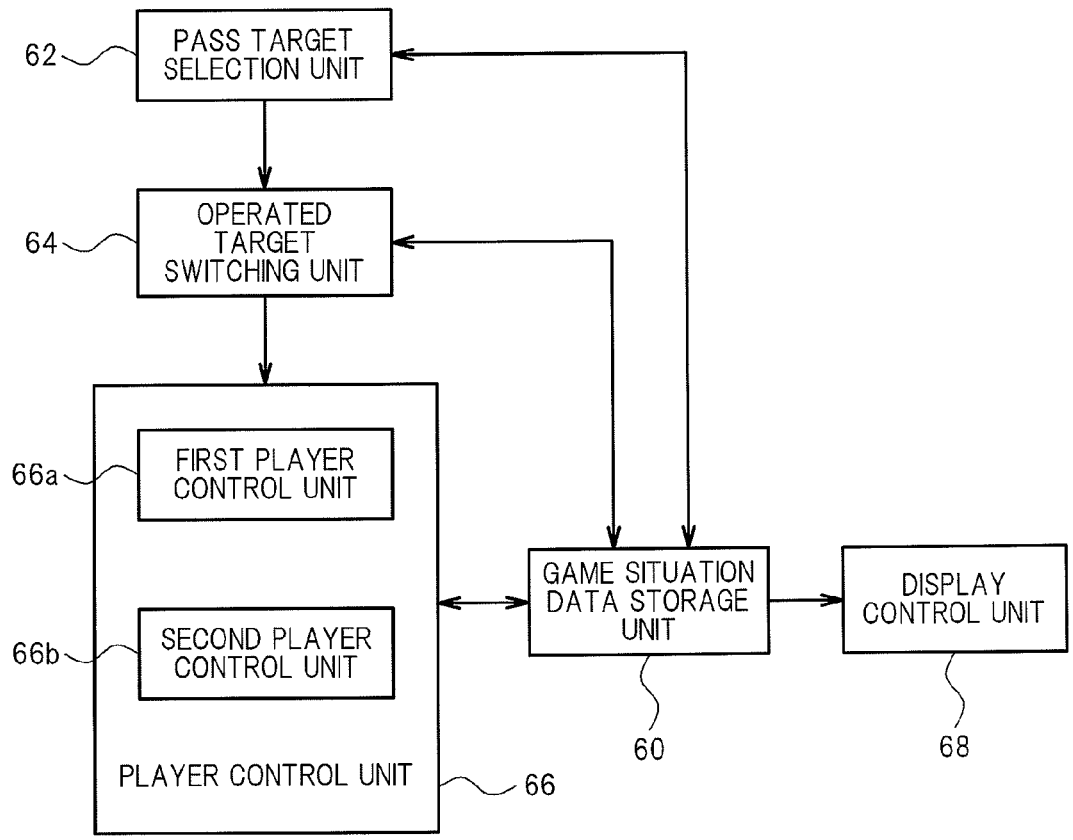
FIG. 7 is a functional block diagram of a game device according to the embodiment.
FIG. 8 is a diagram showing one example of data stored in a game situation data storage unit.

Below, a structure for realizing the above described soccer game will be described. FIG. 7 is a functional block diagram mainly showing functions according to the present invention among those realized in the game device 10. As shown in FIG. 7, the game device 10 comprises a game situation data storage unit 60, a pass target selection unit 62, an operated target switching unit 64, a player control unit 66, and a display control unit 68. The game situation data storage unit 60 is realized using, for example, the main memory 16, and the other function blocks are realized by the microprocessor 14 executing a program. The display control unit 68 is realized using the microprocessor 14 and the image processing unit 18.

The game situation data storage unit 60 stores game situation data describing a current game situation. Specifically, for example, a current state (for example, a position, posture, and so forth) of a player character 46 is stored in the game situation data storage unit 60, where a state (for example, a position, a movement direction, a moving speed, and so forth) of the ball 48 is also stored. Further, a state (for example, a position, a viewing direction, and so forth) of the virtual camera 49 is also stored in the game situation data storage unit 60.

Besides the above, data specifying a player character 46 which is the user's current operated target, a player character 46 which currently is in possession of the ball 48, and so forth, is stored in the game situation data storage unit 60. FIG. 8 is a diagram showing one example of such data. The data shown in FIG. 8 contains "operated player ID", "ball keeping player ID", and "pass target player ID" fields. The "operated player ID" is identification of a player character being operated by a user; the "ball keeping player ID" is identification of a player character 46 keeping the ball 48; and the "pass target player ID" is identification of a player character 46 being set as a target to be directed by a pass from a player character 46 in possession of the ball 48. Note that, in FIG. 8, the letter "A" indicates the ID of the player character 46a in FIG. 4 and the letter "B" indicates the ID of the player character 46b in FIG. 4. The example shown in FIG. 8 corresponds to the situation shown in FIG. 4.

If an operated player character belonging to the first team (hereinafter referred to as a "player character A") is in possession of the ball 48, the pass target selection unit 62 selects a pass target player character 46 (hereinafter referred to as a "player character B") from among the teammate player characters belonging to the first team, based on a user operation.

In this embodiment, the pass target selection unit 62 obtains a priority order of a teammate player character of the first team. A priority order may be determined such that, for example, a player character located closer to the operated player character (or the ball 48) is given higher priority. Note that a priority order may not necessarily be set on all teammate player characters of the first team. That is, for example, a goal keeper may be exempted from being set with a priority order so that the goal keeper cannot be selected as a pass target. The priority order is updated in a case where a positional relationship between the operated player character (or the ball 48) and a teammate player character is changed. With the pass target setting button pressed by a user, the pass target selection unit 62 determines that a user has selected as a pass target a teammate player character having a priority order set thereon corresponding to the number of times the button has been pressed. Specifically, for example, if the pass target setting button is pressed once, it is determined that a teammate player character having the priority order "1" has been selected as a pass target.

If the player character B is selected as a pass target, the operated target switching unit 64 switches the user operated target from the player character A to the player character B. In this case, the "operated player ID" and the "pass target player ID" in the data shown in FIG. 8 are both updated to the ID of the player character B, while the "ball keeping player ID" remains showing the ID of the player character A.

The player control unit 66 carries out action control for a player character 46. In order to cause a player character 46 to perform an action, the player control unit 66 updates the state (for example, a position, posture, a movement direction, and so forth) of the player character 46, stored in the game situation data storage unit 60, such that the player character 46 performs that action. As shown in FIG. 7, the player control unit 66 comprises a first player control unit 66a and a second player control unit 66b.

The first player control unit 66a carries out action control for the player character A after the user operated target is switched from the player character A to the player character B.

For example, the first player control unit 66a (moving control means) causes the player character A to perform a ball keeping action (dribble action) in order to prevent the ball 48 kept thereby from being taken by an opponent player character.

The first player control unit 66a determines whether or not the positions/position of the player character A and/or the ball 48 and the position of the player character B satisfy a condition concerning the positions/position of the player character A and/or the ball 48 and the position of the player character B.

Note that a "condition" refers to a condition used in determining whether or not a pass from the player character A to the player character B will be blocked by an opponent player character. Specifically, for example, a "condition" may be a condition as to whether or not the number of opponent player characters present in an area between the player character A (or the ball 48) and the player character B is 0. Alternatively, for example, a "condition" may be a condition as to whether or not the number of opponent player characters present on or in the vicinity of the straight line from the position of the player character A to the position of the player character B is 0. Note that conditions in the above described two examples are both conditions concerning the positions/position of the player character A and/or the ball 48, the position of the player character B, and the position of an opponent player character.

If it is determined that the above described condition is satisfied, the first player control unit 66a causes the player character A to make a pass to the player character B.

Meanwhile, the second player control unit 66b performs action control for the player character B to which the user operated target has been switched from the player character A, and specifically, causes the player character B to act based on a user operation.

The display control unit 68 produces a game screen 50 showing a picture obtained by viewing the virtual three dimensional space 40 from the virtual camera 49, based on game situation data, and displays the game screen 50 on the monitor 32.

Figure 9:
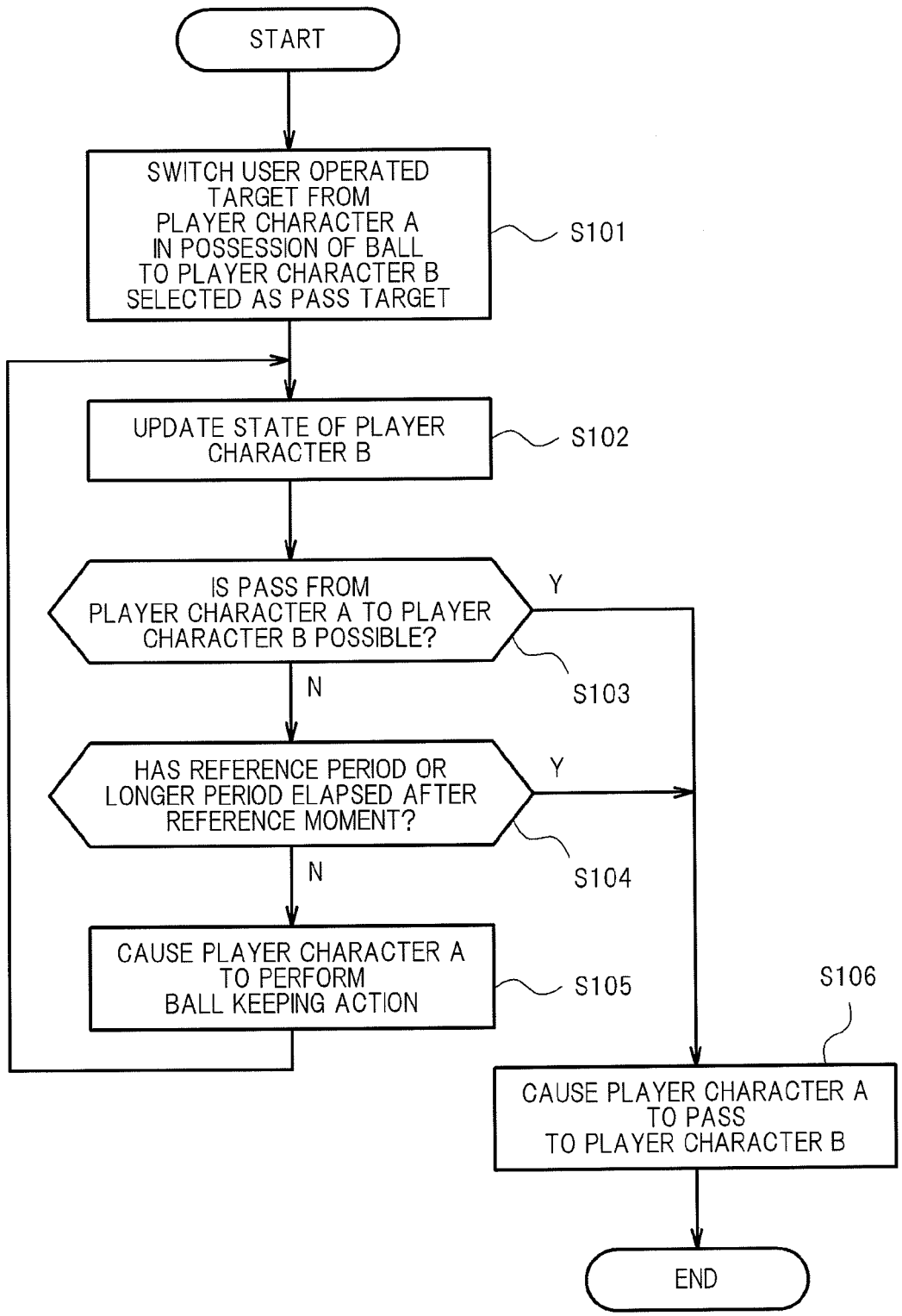
FIG. 9 is a flowchart of a process to be carried out in the game device.

Below, a process to be carried out in the game device 10 will be described. FIG. 9 is a flowchart of a process to be carried out in the game device 10 in a case where the microprocessor 14 (pass target selection unit 62) determines that a user has selected a pass target player character 46 ("player character B" in the below) while the operated player character ("player character A" in the below) is in possession of the ball 48.

Initially, the microprocessor 14 (the operated target switching unit 64) switches the user operated target to the player character B which is selected as a pass target (S101). In this case, the "operated player ID" in the data shown in FIG. 8 is updated to the ID of the player character B. The "pass target player ID" in the data shown in FIG. 8 is also updated to the ID of the player character B.

Thereafter, the microprocessor 14 (the second player control unit 66*b*) updates a state (a position, posture, and so forth) of the player character B, based on the content of a user operation (S102). For example, the microprocessor 14 moves the player character B, based on a user's movement instruction operation. Note that although not shown in FIG. 9, a process for updating the states of teammate player characters other than the player character A and those of the opponent player characters are carried out in parallel to the process at S102.

The microprocessor 14 (the first player control unit 66*a*) determines whether or not a situation allows a pass from the player character A in possession of the ball 48 to the player character B (S103). For example, whether or not the number of opponent player characters present in the area between the player character A and the player character B is 0 is determined. If the number of opponent player characters present in the area between the player character A and the player character B is 0, it is determined that the situation allows a pass from the player character A to the player character B.

Meanwhile, if it is determined that the situation does not allow a pass from the player character A to the player character B, the microprocessor 14 (the first player control unit 66*a*) then determines whether or not a period of time elapsed after a reference moment has reached a reference period (e.g., three seconds) (S104). Note that a "reference moment" refers to a moment based on either a moment at which, for example, the player character B is selected as a pass target or the user operated target is switched from the player character A to the player character B. More specifically, a "reference moment" may be a moment at which the player character B is selected as a pass target, or a moment at which the user operated target is switched from the player character A to the player character B.

If it is determined that the period after a reference moment has not yet reached a reference period, the microprocessor 14 (the first player control unit 66*a*) causes the player character A to perform a ball keeping action (S105). That is, the microprocessor 14 causes the player character A to perform a dribble action, based on the position of an opponent player character, in order to prevent the ball 48 from being taken by an opponent player character. Specifically, for example, the microprocessor 14 moves the player character A and the ball 48 while maintaining a predetermined distance or a longer distance between the player character A (or the ball 48) and the opponent player.

Figure 10:
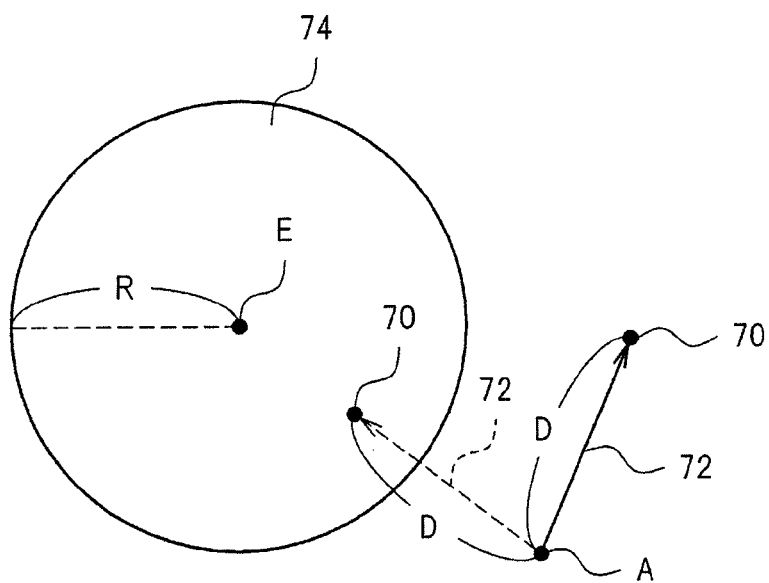
FIG. 10 is a diagram explaining a process for causing a player character to perform a ball keeping action.

FIG. 10 is a diagram explaining one example of a process at this step. Note that in FIG. 10, the letter "A" refers to the current position of the player character A, and the letter "E" refers to the current position of an opponent player character.

In the process at this step, initially, a movement destination candidate 70 for the player character A is obtained. Specifically, in order to obtain the movement destination candidate 70, a movement direction candidate 72 for the player character A is initially determined, and a position displaced from the current position of the player character A in the movement direction candidate 72 by a distance (D) based on the moving speed of the player character A is obtained as the movement destination candidate 70 for the player character A. With the movement destination candidate 70 for the player character A obtained, whether or not the movement destination candidate 70 is located within a nearby area 74 of any opponent player character is determined. A "nearby area 74 of any opponent player character" refers to an area set based on the position of an opponent player character, specifically being an area, for example, within a predetermined distance (R) from an opponent player character.

If the movement destination candidate 70 is located within a nearby area 74 of any opponent player character, the movement direction candidate 72 for the player character A is corrected to again obtain a movement destination candidate 70 (correction), and a similar determination process is carried out. In FIG. 10, the movement direction candidate 72 indicated by the dotted line and the corresponding movement destination candidate 70 represent a movement destination candidate 70 and a movement direction candidate 72 before correction, and the movement direction candidate 72 indicated by the solid line and the corresponding movement destination candidate 70 represent a movement destination candidate 70 and a movement direction candidate 72 after correction.

Meanwhile, if the movement destination candidate 70 is located outside the nearby areas 74 of all opponent player characters, the movement destination candidate 70 is determined as a movement destination position for the player character A, and the position of the player character A is updated to that movement destination position. In addition, the position of the ball 48 is updated in accordance with change in position of the player character A.

Alternatively, the movement destination position of the ball 48 may be determined first, and the position of the player character A may be thereafter updated in accordance with change in position of the ball 48. In this case, the movement destination position of the ball 48 may be determined using a method similar to the above described method used in determining the movement destination position of the player character A.

After the process at S105, a process at S102 is carried out again. The processes at S102 to S105 are repeated every predetermined period of time (for example, $\frac{1}{60}^{th}$ of a second) unless the determination result at S103 or S104 becomes true ("Y" in FIG. 9).

Meanwhile, if it is determined at S103 that the situation allows a pass from the player character A to the player character B, the microprocessor 14 (the first player control unit 66*a*) causes the player character A to make a pass to the player character B (S106). In this process, the posture of the player character A is updated according to pass motion data. Further, a pass target position (a movement destination position of the ball 48) is determined based on the position of the player character B. The pass target position may be the current position of the player character B or a future position of the same anticipated based on the current position of the same.

With the pass target position determined, the movement direction of the ball 48 is set to the direction extending from the position of the player character A to the pass target position, and the microprocessor 14 causes the ball 48 to start moving in the movement direction. In this case, the position of the ball 48 stored in the game situation data storage unit 60 is updated so as to move in the above-described movement direction.

Note that the "pass target player ID" in the data shown in FIG. 8 is cleared in this case to return to the initial state (for example, a blank state). In addition, if the player character A safely receives the ball 48, the "ball keeping player ID" in the data shown in FIG. 8 is updated to the ID of the player character A. Meanwhile, if the ball 48 is taken by an opponent player character, the "ball keeping player ID" in the data shown in FIG. 8 is updated to the ID of the opponent player character.

Note that although not shown in the flowchart in FIG. 9, the microprocessor 14 (the display control unit 68) updates the game screen 50 every predetermined period of time (for example, 1/60$^{th}$ of a second).

According to the above described game device 10, at the moment when a pass between player characters 46 is made, a user can control the receiving player characters 46. This resultantly can improve operability of an operation related to a pass between player characters 46.

In the game device 10, in a case where the user operated target is switched to a pass target player character 46, the player character 46 in possession of the ball 48 begins a ball keeping action to prevent the ball 48 from being taken by an opponent player character. Therefore, in the game device 10, a user can concentrate on operating a pass receiving player character 46. This can resultantly improve operability of an operation related to a pass between player characters 46.

In the game device 10, whether or not a situation allows a pass to a pass target player character 46 is monitored, and in a case where it is determined that the situation allows such a pass, such a pass is automatically made. Therefore, according to the game device 10a, a user does not need to monitor whether or not a situation allows a pass to a pass target player character 46, and rather can concentrate on operating a pass receiving player character 46. As a result, operability of an operation related to a pass between player characters 46 can be improved.

Note that, in the game device 10, a user needs to move a pass receiving player character 46 to a position where the player character 46 will be able to receive a pass from a player character 46 in possession of the ball 48 without being blocked by an opponent player character. In the game device 10 in particular, a user needs to perform such a movement operation within a restriction period (for example, three seconds). This can give a user the enjoyment of being required to perform such a movement operation within a restriction period in the game device 10, which resultantly can enhance excitement in operating a pass receiving player character 46.

Note that the present invention is not limited to the above-described embodiment.

First Modified Example

If it is determined at S104 in FIG. 9 that the period of time elapsed after a reference moment has reached a reference period, a ball keeping action by the player character A may be restricted (for example, suppressed). Specifically, if it is determined at S104 that the period of time elapsed after a reference moment has reached a reference period, a process at S102 may be carried out again without carrying out the process at S105. In this case, a possibility that the player character A will be deprived of the ball 48 by an opponent player character will increase as a process (S105) for preventing the player character A or the ball 48 from getting closer to an opponent player character is not carried out. In this manner as well, it is possible to give a user the enjoyment of being required to perform a movement operation relative to a pass receiving player character 46 within a restriction period, which can resultantly enhance excitement in operating a pass receiving player character 46.

Second Modified Example

During a period with the process at S102 to S105 in FIG. 9 being repeated, that is, during a period in which whether or not the period of time elapsed after a reference moment has reached a reference period is monitored, the period of time elapsed after the reference moment may be presented to a user. Alternatively, the remaining period of time to a moment at which a reference period will have elapsed after the reference moment may be presented to a user.

For example, an image presenting the period of time elapsed after a reference moment or the remaining period of time until a moment at which a reference period will have elapsed after the reference moment may be displayed on the game screen 50. Alternatively, for example, a sound notifying of the period of time elapsed after the reference moment or the remaining period of time until a moment at which a reference period will have elapsed after the reference moment may be output via the speaker 34. Still alternatively, for a controller 30 capable of vibration, the controller 30 may be vibrated based on the period of time elapsed after a reference moment, to thereby notify of the period of time elapsed after the reference moment. Further alternatively, the controller 30 may be vibrated based on the remaining period of time until a moment at which a reference period will have elapsed after the reference moment, to thereby notify of the above described remaining period. Specifically, for example, the controller 30 may be vibrated when it comes to a moment with only one second left. According to the second modified example, it is possible to arrange such that a user can know the period of time elapsed after a reference moment or the remaining period of time until a moment at which a reference period will have elapsed after the reference moment. That is, it is possible to arrange such that a user can anticipate a time at which the pass process at S106 in FIG. 8 starts.

Third Modified Example

The reference period at S104 in FIG. 9 may be set based on a user operation. According to the third modified example, for example, reference period information concerning a reference period is stored so as to be correlated to each of a plurality of reference operation information items. If a user performs an operation corresponding to any of the reference operation information items, a reference period is set based on the reference period information correlated to that reference operation information. This will be specifically described below.

For example, a plurality of buttons are set so as to function as pass target setting buttons, and reference period information is stored so as to be correlated to each of the plurality of pass target setting buttons. In this case, with any pass target setting button pressed by a user, any player character (teammate player character) is set as a pass target and that player character is set as a user operated target. Then, a reference period is set at S104 in FIG. 9, based on the reference period information correlated to the pass target setting button pressed by a user. For example, assume that the first button and the second button are set as pass target setting buttons and that information "three seconds" is stored as reference period information correlated to the first button and information "five seconds" is stored as reference period information correlated to the second button. In this case, with the first button pressed by a user as a pass target setting button, the reference period is set to three seconds, and with the second button pressed as a pass target setting button, the reference period is set to five seconds. In the above described manner, a user can designate a reference period by pressing a button as a pass target setting button.

Note that reference period information may be stored so as to be correlated to each of the plurality of buttons which are not pass target setting buttons. In this case, a user presses any of the above described plurality of buttons together with a pass target setting button. Then, a reference period is set at S104 in FIG. 9, based on the reference period information correlated to the button pressed by a user together with the pass target setting button. In this manner, a user can designate a reference period by pressing a button together with the pass target setting button.

If the controller 30 has an operating lever (an operating stick), information indicating an inclination direction in which to incline the operating lever may be stored so as to be correlated to reference period information. In this case, an inclination direction in which the operating lever is inclined at a certain time (e.g., a time at which the pass target setting button is pressed) is obtained, and a reference period is set at S104 in FIG. 9, based on the reference period information correlated to that inclination direction. In this manner, a user can designate a reference period by inclining the operating lever in a direction while pressing the pass target setting button.

Further, with a structure capable of detecting inclination of the controller 30, information describing inclination of the controller 30 and reference period information may be stored so as to be correlated to each other. In this case, inclination of the controller 30 at a certain time (e.g., a time at which the pass target setting button is pressed) is obtained, and a reference period is set at S104 in FIG. 9, based on the reference period information correlated to that inclination. In this manner, a user can instruct a reference period by changing inclination of the controller 30 while pressing the pass target setting button.

Fourth Modified Example

Figure 11:
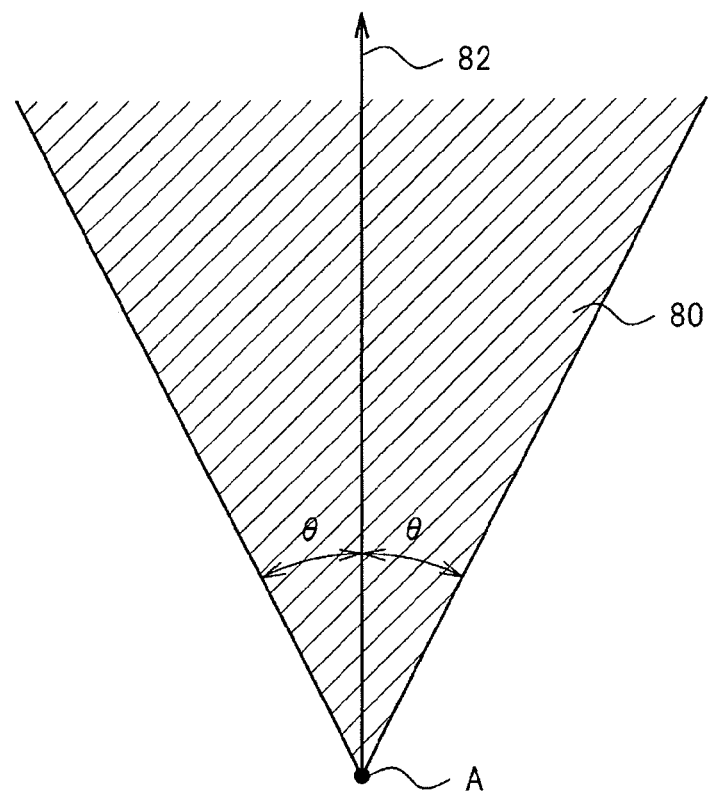
FIG. 11 is a diagram showing one example of a target area.

An operation for selecting a pass target player character 46 is not limited to the above described aspect. Below, another aspect of an operation for selecting a pass target player character 46 will be described. According to this aspect, a user presses a predetermined button of the controller 30 while designating their desired direction, using the controller 30. Then, any of the teammate player characters present in a target area based on the direction designated by a user is selected. FIG. 11 is a diagram showing one example of a target area. In FIG. 11, the letter "A" indicates the position of the operated player character in possession of the ball 48. The target area 80 shown in FIG. 11 is an area with an angle formed relative to the straight line 82 extending from the position (A) of the operated player character in the direction designated by a user, being equal to or smaller than a predetermined angle θ. If only one teammate player character is present in the target area 80, the teammate player character is selected as a pass target. Meanwhile, if two or more teammate player characters are present in the target area 80, a teammate player character located, for example, closest to the operated player character among the plurality of teammate player characters is selected as a pass target.

Fifth Modified Example

It may be arranged such that only a player character 46 which satisfies a predetermined condition (a predetermined second condition) may be selected as a pass target from among the teammate player characters. For example, a "predetermined condition" is a condition as to whether or not a position of a player character is a predetermined position (for example, forward). In this manner, a user can enjoy operating a forward player character 46 waiting for a through-pass from a teammate player character, while paying attention so as not to violate, for example, an off-side rule.

Note that a "predetermined condition" may be a condition as to whether or not a parameter value indicating whether or not a player character has special ability is equal to a predetermined value (a value indicating possession of special ability). Alternatively, a "predetermined condition" may be a condition as to whether or not a parameter value indicating a pass-receiving ability is equal to or larger than a reference value. Still alternatively, a "predetermined condition" may be a condition as to whether or not a player character is a specific player character 46 having been selected in advance by a user.

Sixth Modified Example

A pass target player character 46 may be selected from among the teammate player characters, based on a strategy for the first team. Specifically, for example, if a "right-side attack" game plan is set for the first team, a teammate player character whose position is relatively close to the right side line 42b may be selected with priority as a pass target. For example, if a "side change" game plan is set for the first team, a teammate player character located relatively close to the side line 42a opposite to the side line 42b near which a player character 46 in possession of the ball 48 is located may be selected with priority as a pass target. In the latter case, a pass to be made at S106 in FIG. 9 is not a pass of a type with the ball 48 rolling on the field 42 but a pass of a type with the ball 48 moving through the air.

In the sixth modified example, data correlating a strategy and selection control information concerning selection of a pass target player character 46 is stored, and selection control information correlated to a strategy for the first team set by a user is obtained based on the above described data. Further, a pass target player character 46 is selected based on the selection control information. In this manner, a pass target player character 46 is selected in accordance with a strategy for the first team, set by a user.

Seventh Modified Example

In the process in FIG. 9, if the player character A is not a player character 46 which satisfies a predetermined condition (predetermined first condition), switching of the user operated target from the player character 46a to the player character 46b (S101), or a pass from the player character 46a to the player character 46b (S106), may be restricted.

Here, for example, a "predetermined condition" is a condition as to whether or not a parameter value indicating whether or not a player character has pass-related or ball keeping-related special ability is equal to a predetermined value (a value indicating possession of special ability). Alternatively, a "predetermined condition" may be a condition as to whether or not a parameter value indicating the pass ability or ball keeping ability is equal to or larger than a reference value. Then, only when the pass ability or ball keeping ability of the player character A in possession of the ball 48 is high, a user may be allowed to operate the player character B which will receive a pass from the player character A.

Note that a "predetermined condition" may be a condition as to whether or not a position of a player character is a specific position (for example, a midfielder). Alternatively, a "predetermined condition" may be a condition as to whether or not a player character is a specific player character 46 selected in advance by a user.

Eighth Modified Example

The type of a pass to be made at S106 in FIG. 9 may be determined based on a user operation. In the eighth modified example, pass type information concerning a pass type is stored so as to be correlated to each of a plurality of reference operation information items. If a user performs an operation corresponding to any reference operation information, the type of a pass to be made at S106 in FIG. 9 is set based on the pass type information correlated to that reference operation information. Below, this will be more specifically described.

For example, a plurality of buttons are set so as to function as pass target setting buttons and pass type information is stored so as to be correlated to each of the plurality of pass target setting buttons. With any pass target setting button pressed by a user, any player character (teammate player character) is set as a pass target and that player character is set as a user operated target. Then, the type of a pass is set at S106 in FIG. 9, based on the pass type information correlated to the pass target setting button pressed by a user. For example, assume a case in which the first button and the second button are set to function as pass target setting buttons, in which the first button is correlated to "a pass of a type with the ball 48 rolling on the field 42" and the second button is correlated to "a pass of a type with the ball 48 moving through the air". In this case, with the first button pressed by a user as a pass target setting button, "a pass of a type with the ball 48 rolling on the field 42" is made at S106 in FIG. 9. Meanwhile, with the second button pressed by a user as a pass target setting button, "a pass of a type with the ball 48 moving through the air" is made at S106 in FIG. 9. In this manner, a user can designate a type of pass by pressing a button as a pass target setting button.

Note that a user may designate a pass type by utilizing, for example, an inclination direction of the operating lever or inclination of the controller 30.

Other Modified Examples

A game to be executed in the game device 10 is not limited to a game in which a three dimensional game space having three coordinate elements is displayed in a game screen. A game to be executed in the game device 10 may be a game in which a two dimensional game space having two coordinate elements is displayed in a game screen. That is, a game to be executed in the game device 10 may be a game in which the positions or the like of the ball and a player character are managed using two coordinate elements.

A game to be executed in the game device 10 may be a network game to be participated in by a plurality of users via a network. Further, a game to be executed in the game device 10 may be a sport game other than a soccer game. For example, the present invention can be applied to a game of basketball played using a ball (moving object) or a game of ice hockey played using a puck (moving object).

The invention claimed is:

1. A game device for executing a sport game played between a user operated team and an opponent team using a moving object, the game device comprising:
    a pass target selecting unit that selects a player character to be a pass target from among player characters belonging to the operated team, based on a user operation, in a case where a first player character which is a user operated target among player characters belonging to the operated team is in possession of the moving object;
    an operated target switching unit that switches, in response to a second player character being selected as the pass target by the pass target selecting unit, the user operated target from the first player character to the second player character;
    a first player control unit that controls an action of the first player character after the user operated target is switched from the first player character to the second player character; and
    a second player control unit that moves the second player character based on a user operation, after the user operated target is switched from the first player character to the second player character,
    wherein
    the first player control unit:
        moves the first player character and the moving object, based on a position of a player character belonging to the opponent team,
        determines whether one or more positions of the first player character or/and the moving object and a position of the second character satisfy a condition, and
        causes, when the condition is satisfied, the first player character to make a pass to the second player character.

2. The game device according to claim 1, wherein the first player control unit:
    determines whether a reference period of time has elapsed after a reference moment, and
    causes, when the reference period of time has elapsed after the reference moment, the first player character to make a pass to the second player character.

3. A game device for executing a sport game played between a user operated team and an opponent team using a moving object, the game device comprising:
    a pass target selecting unit that selects a player character to be a pass target from among player characters belonging to the operated team, based on a user operation, in a case where a first player character which is a user operated target among player characters belonging to the operated team is in possession of the moving object;
    an operated target switching unit that switches, in response to a second player character being selected as the pass target by the pass target selecting unit, the user operated target from the first player character to the second player character;
    a first player control unit that controls an action of the first player character after the user operated target is switched from the first player character to the second player character; and
    a second player control unit that moves the second player character based on a user operation, after the user operated target is switched from the first player character to the second player character, wherein
the first player control unit:
moves the first player character and the moving object, based on a position of a player character belonging to the opponent team,
determines whether one or more positions of the first player character or/and the moving object and a position of the second character satisfy a condition, and
causes, when the condition is satisfied, the first player character to make a pass to the second player character,
wherein
the first player control unit:
determines whether a reference period of time has elapsed after a reference moment, and
causes, when the reference period of time has elapsed after the reference moment, the first player character to make a pass to the second player character, and
wherein the first player control unit sets the reference period of time, based on a user operation.

4. The game device according to claim 2, further comprising a unit that presents to a user either a period of time elapsed after the reference moment or a remaining period of time until the reference period of time will have elapsed after the reference moment.

5. The game device according to claim 1, wherein the first player control unit:
determines whether a reference period of time has elapsed after a reference moment, and
prevents, when the reference period of time has elapsed after the reference moment, execution of moving control of the first player character and the moving object by the movement control unit.

6. The game device according to claim 5, wherein the first player control unit sets the reference period of time, based on a user operation.

7. The game device according to claim 5, further comprising a unit that presents to a user either a period of time elapsed after the reference moment or a remaining period of time until the reference period of time will have elapsed after the reference moment.

8. The game device according to claim 1, wherein the first player control unit determines a type of a pass from the first player character to the second player character, based on a user operation.

9. The game device according to claim 1, further comprising unit that prevents, when the first player character is not a player character which satisfies a predetermined first condition, switching of the user operated target by the operated target switching unit or execution of control by the first player control unit.

10. The game device according to claim 1, wherein when the first player character is in possession of the moving object, the pass target selecting unit selects as a player character to be a pass target, a player character which satisfies a predetermined second condition from among the player characters belonging to the operated team, based on a user operation.

11. The game device according to claim 1, further comprising:
a unit that encourages to a user to set action control information concerning action control of the player characters belonging to the operated team, and
a control unit that controls, after the user operated target is switched from the first player character to the second player character by the operated target switching unit, actions of player characters other than the first player character and the second player character among the player characters belonging to the operated team, based on the action control information set by the user,
wherein
when the first player character is in possession of the moving object, the pass target selecting unit selects a player character to be a pass target from among the player characters belonging to the operated team, based on the action control information set by the user.

12. A method for controlling a game device, including a processor and a memory, to execute a sport game played between a user operated team and an opponent team using a moving object, the method comprising:
selecting a player character to be a pass target from among player characters belonging to the operated team, based on a user operation, in a case where a first player character which is a user operated target among player characters belonging to the operated team is in possession of the moving object;
switching by the processor, in response to a second player character being selected as the pass target, the user operated target from the first player character to the second player character;
controlling an action of the first player character after the user operated target is switched from the first player character to the second player character, and
moving the second player character based on a user operation, after the user operated target is switched from the first player character to the second player character,
wherein
controlling the action of the first player character comprises:
moving the first player character and the moving object, based on a position of a player character belonging to the opponent team,
determining whether one or more positions of the first player character or/and the moving object and a position of the second character satisfy a condition, and
causing, when the condition is satisfied, the first player character to make a pass to the second player character.

13. A computer readable information storage medium storing in non-transitory form a program for causing a computer to function as a game device for executing a sport game played between a user operated team and an opponent team using a moving object, the program for causing the computer to function as:
a pass target selecting unit that selects a player character to be a pass target from among player characters belonging to the operated team, based on a user operation, in a case where a first player character which is a user operated target among player characters belonging to the operated team is in possession of the moving object;
an operated target switching unit that switches, if a second player character is selected as the pass target by the pass target selecting unit, the user operated target from the first player character to the second player character;
a first player control unit that controls an action of the first player character after the user operated target is switched from the first player character to the second player character; and
a second player control unit that moves the second player character based on a user operation, after the user operated target is switched from the first player character to the second player character, wherein the first player control unit:

moves the first player character and the moving object, based on a position of a player character belonging to the opponent team, determines whether one or more positions of the first player character or/and the moving object and a position of the second character satisfy a condition, and causes, when the condition is satisfied, the first player character to make a pass to the second player character.

14. A method for controlling a game device, including a processor and a memory, to execute a sport game played between a user operated team and an opponent team using a moving object, the method comprising:

selecting a player character to be a pass target from among player characters belonging to the operated team, based on a user operation, in a case where a first player character which is a user operated target among player characters belonging to the operated team is in possession of the moving object;

switching by the processor, in response to a second player character being selected as the pass target, the user operated target from the first player character to the second player character;

controlling an action of the first player character after the user operated target is switched from the first player character to the second player character, and moving the second player character based on a user operation, after the user operated target is switched from the first player character to the second player character, wherein controlling the action of the first player character comprises:

moving the first player character and the moving object, based on a position of a player character belonging to the opponent team, determining whether one or more positions of the first player character or/and the moving object and a position of the second character satisfy a condition, and causing, when the condition is satisfied, the first player character to make a pass to the second player character, wherein controlling the action of the first player character further comprises:

determining whether a reference period of time has elapsed after a reference moment, and causing, when the reference period of time has elapsed after the reference moment, the first player character to make a pass to the second player character, and wherein the reference period of time is set based on a user operation.

15. A computer readable information storage medium storing in non-transitory form a program for causing a computer to function as a game device for executing a sport game played between a user operated team and an opponent team using a moving object, the program for causing the computer to function as:

a pass target selecting unit that selects a player character to be a pass target from among player characters belonging to the operated team, based on a user operation, in a case where a first player character which is a user operated target among player characters belonging to the operated team is in possession of the moving object;

an operated target switching unit that switches, if a second player character is selected as the pass target by the pass target selecting unit, the user operated target from the first player character to the second player character;

a first player control unit that controls an action of the first player character after the user operated target is switched from the first player character to the second player character; and a second player control unit that moves the second player character based on a user operation, after the user operated target is switched from the first player character to the second player character, wherein the first player control unit:

moves the first player character and the moving object, based on a position of a player character belonging to the opponent team, determines whether one or more positions of the first player character or/and the moving object and a position of the second character satisfy a condition, and causes, when the condition is satisfied, the first player character to make a pass to the second player character, wherein the first player control unit:

determines whether a reference period of time has elapsed after a reference moment, and causes, when the reference period of time has elapsed after the reference moment, the first player character to make a pass to the second player character, and wherein the first player control unit sets the reference period of time, based on a user operation.

* * * * *